United States Patent
Agostini

(10) Patent No.: US 11,800,630 B2
(45) Date of Patent: Oct. 24, 2023

(54) APPARATUSES FOR GENERATING NEUTRONS

(71) Applicant: ENEA—Agenzia Nazionale per le Nuove Tecnologie, l'Energia e lo Sviluppo Economico Sostenibile, Rome (IT)

(72) Inventor: Pietro Agostini, Rome (IT)

(73) Assignee: ENEA Agenzia Nazionale per le Nuove Tecnologie, l'Energia e lo Sviluppo Economico Sostenibile, Rome (IT)

(*) Notice: Subject to any disclaimer, the term of this patent is extended or adjusted under 35 U.S.C. 154(b) by 0 days.

(21) Appl. No.: 17/277,629

(22) PCT Filed: Mar. 12, 2019

(86) PCT No.: PCT/IB2019/051972
§ 371 (c)(1),
(2) Date: Mar. 18, 2021

(87) PCT Pub. No.: WO2020/058774
PCT Pub. Date: Mar. 26, 2020

(65) Prior Publication Data
US 2021/0315090 A1   Oct. 7, 2021

(30) Foreign Application Priority Data
Sep. 20, 2018 (IT) .................. 102018000008779

(51) Int. Cl.
*H05H 6/00* (2006.01)
*H05H 3/06* (2006.01)
(Continued)

(52) U.S. Cl.
CPC ............. *H05H 3/06* (2013.01); *H05H 6/00* (2013.01); *G21G 4/02* (2013.01); *G21K 5/08* (2013.01); *H05H 2242/10* (2013.01)

(58) Field of Classification Search
CPC .. G21G 4/02; H05H 6/00; H05H 3/06; H05H 2242/10; G21K 5/08
See application file for complete search history.

(56) References Cited

U.S. PATENT DOCUMENTS 3,733,490 A   5/1973   Roche
4,090,086 A * 5/1978  Cranberg ............... H05H 3/06
                                              250/282

(Continued)

FOREIGN PATENT DOCUMENTS

DE   2942923 A  * 5/1981  ............ G21K 5/08
DE   2942923 A1 * 5/1981  ............ G21K 5/08
WO   2016060867 A1  4/2016

OTHER PUBLICATIONS

International Search Report and Written Opinion in corresponding International Application No. PCT/IB2019/051972 dated Jun. 5, 2019, 13 pages.

*Primary Examiner* — Lily C Garner
(74) *Attorney, Agent, or Firm* — MH2 TECHNOLOGY LAW GROUP LLP

(57) ABSTRACT

An apparatus for generating neutrons may include: a hollow casing configured to rotate about a central axis, the casing including a wall having a central region substantially at the central axis and a peripheral region, wherein the wall defines a cavity, and wherein the cavity is configured to contain a first coolant fluid; an active layer at least partially on the peripheral region external to the cavity, wherein the active layer is configured to realize a neutron-generating reaction; at least one particle accelerator configured to direct an ion beam on the active layer to activate the neutron-generating (Continued)

reaction; movement means configured to rotate the casing about the central axis and to force the first coolant fluid to contact the wall at the active layer for cooling the casing; and external cooling including a second coolant fluid contacting at least an external portion of the wall.

20 Claims, 5 Drawing Sheets

(51) Int. Cl.
*G21G 4/02* (2006.01)
*G21K 5/08* (2006.01)

(56) References Cited

U.S. PATENT DOCUMENTS

| | | | | |
|---|---|---|---|---|
| 5,392,319 A | * | 2/1995 | Eggers | H05H 3/06 376/151 |
| 2006/0050832 A1 | * | 3/2006 | Buckley | G21G 4/00 376/194 |

* cited by examiner ant to an embodiment of the present invention.

APPARATUSES FOR GENERATING NEUTRONS

CROSS-REFERENCE TO RELATED APPLICATION(S)

This application is a national stage entry from International Application No. PCT/IB2019/051972, filed on Mar. 12, 2019, in the Receiving Office ("RO/IB") of the International Bureau of the World Intellectual Property Organization ("WIPO"), and published as International Publication No. WO 2020/058774 A1 on Mar. 26, 2020; International Application No. PCT/IB2019/051972 claims priority from Italian Patent Application No. 102018000008779, filed on Sep. 20, 2018, in the Italian Patent and Trademark Office ("IPTO"), the entire contents of all of which are incorporated herein by reference.

DESCRIPTION

The present invention relates to an apparatus for generating neutrons. The apparatus according to the present invention is usefully employed in the radiation and examination of materials.

It is known from the state of the art an apparatus for generating neutrons, in particular, fast neutrons. The apparatus comprises a particle accelerator which directs an ion beam on a target surface causing a nuclear fusion reaction producing the mentioned neutrons.

In greater detail, the apparatus comprises a hollow rotating structure onto which the target surface is externally positioned. Cooling means are active on the target surface, such as to remove the high thermal power generated by the accelerator on the target surface by means of water recirculation.

In further detail, the known rotating structure makes the ion beam affect a single localized region of the target surface. Thereby, the hollow structure is not exceedingly stressed. Cooling means, in fluid communication with the rotating structure, allow to cool the rotating structure internally. In still greater detail, cooling means comprise a tubing net to take a coolant liquid to the rotating structure near the target surface.

Document WO 2016060867, to GTAT Corporation, discloses an apparatus for producing neutrons by means of a reaction caused by an ion beam affecting a rotating target. The apparatus for producing neutrons shown in this document comprises cooling means which allow a cooling liquid to wet the rotating target ensuring the removal of power produced during neutron production. In greater detail, cooling means are in fluid communication with the rotating target and allow, by means of an external pump, the coolant fluid to recirculate in a capillary net arranged in the rotating target.

Disadvantageously, in order to ensure the operation of cooling means, the known apparatuses comprise a rotating seal. Therefore, they increase the likelihood of coolant fluid leakages containing radioactive material and the break of the whole apparatus.

Disadvantageously, the removal of thermal power from the target surface is limited by the extent of coolant fluid in the capillary net.

Disadvantageously, the known apparatuses are not able to obtain high neutron flows because of the reduced capacity of removing thermal power.

SUMMARY OF THE INVENTION

In this context, the technical task underlying the present invention is to provide an apparatus for generating neutrons which overcomes the aforementioned drawbacks of the known art.

In particular, it is the object of the present invention to make available an apparatus for generating neutrons able to guarantee high safety and reliability levels both during operation and maintenance.

The mentioned technical task and the specified objectives are substantially obtained by an apparatus for generating neutrons comprising the technical characteristics in one or more of the enclosed claims.

The present invention has as an object an apparatus for generating neutrons comprising a hollow casing having a central axis and configured to rotate about said central axis. Such hollow casing comprises a wall having a central region substantially at the central axis and a peripheral region external to said central region. In particular, the wall defines a cavity configured to contain one first coolant fluid.

An active layer is at least partially positioned on the peripheral region externally to the cavity. More in detail, the active layer is configured to realize a neutron-generating reaction.

The apparatus comprises at least a particle accelerator configured to direct an ion beam on the active layer to activate the reaction. Furthermore, the apparatus comprises movement means configured to rotate the hollow casing about the central axis. Thereby, movement means force the first coolant fluid to lightly touch internally the wall at the active layer to cool the hollow casing.

External cooling means are configured to cool the hollow casing externally. In particular, external cooling means comprise a second coolant fluid lightly touching externally at least partially the wall. The hollow casing is sealed from an external environment to retain the first coolant fluid within the cavity.

Advantageously, movement means allow to direct the first coolant fluid at the active layer where the reaction takes place and by means of a phase change of the first coolant fluid they remove heat at the active layer thereof. Thereby, movement means reduce the components necessary for cooling the hollow casing. In particular, the pump for cooling the casing is no longer necessary.

Advantageously, movement means and external cooling means allow to dissipate a big amount of thermal power released on the active layer thanks to a first phase change of the first coolant liquid. Furthermore, movement and external cooling means are configured to transfer the removed thermal power outwardly realizing a second phase change of the first coolant fluid near the wall. An improved dissipation of thermal power reduces the risks of breaking the hollow casing and allows to generate high neutron flows.

Advantageously, the casing can be easily removed and transported in a reconditioning section with no risks of releasing possible radioactive products as it is sealed.

Advantageously, the casing sealing allows to avoid the first coolant fluid leakages during the rotation of the casing itself.

BRIEF DESCRIPTION OF THE DRAWINGS

Further characteristics and advantages of the present invention will appear more apparent from the indicative, and therefore non-limiting description of a preferred, though not exclusive, embodiment of an apparatus for generating neutrons, as illustrated in the enclosed drawings wherein.

DETAILED DESCRIPTION

Figure 1:
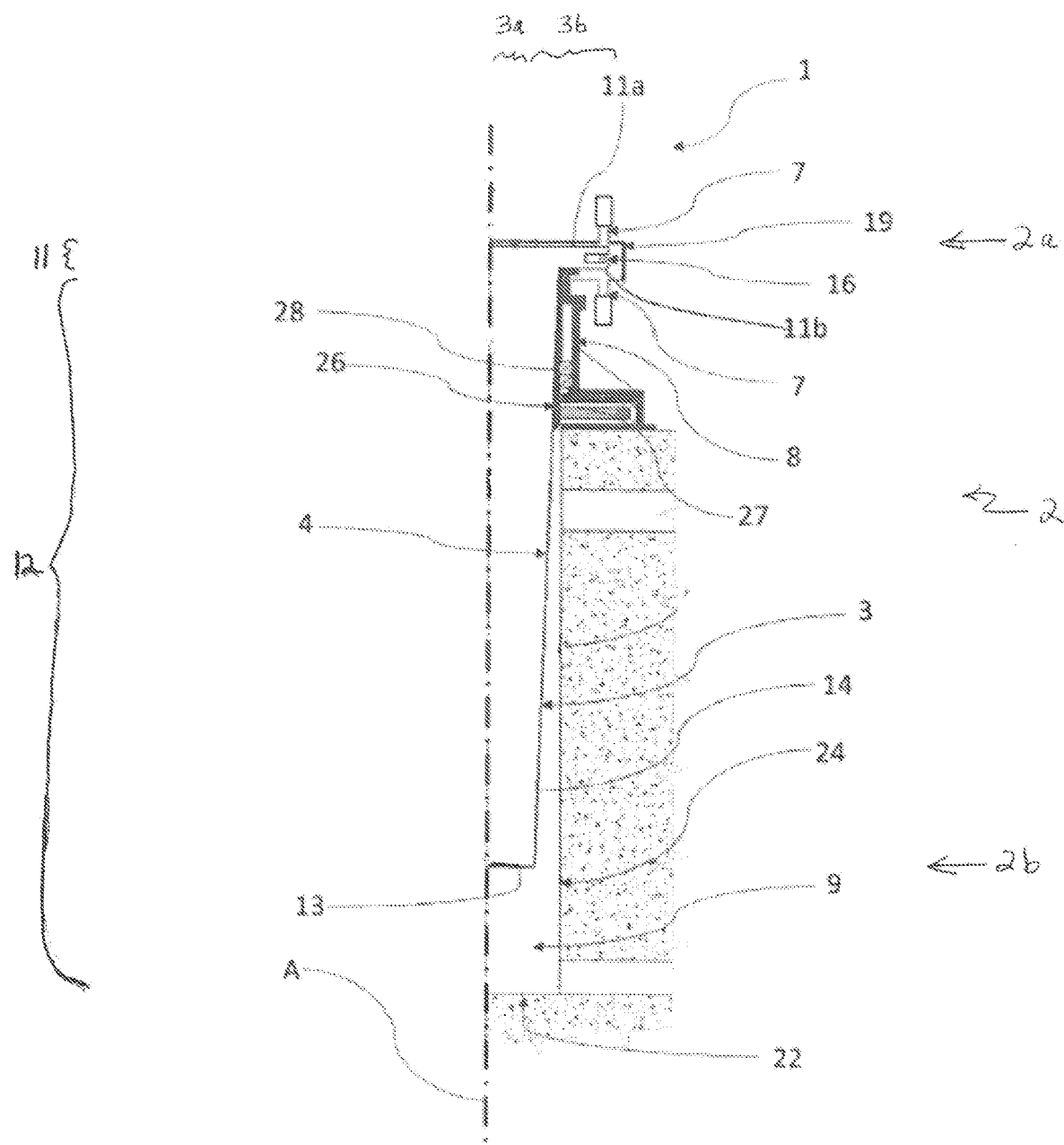
FIG. 1 is a section view of an apparatus for generating neutrons according to an embodiment of the present invention.

Referring to the enclosed drawings, 1 indicates a neutron-generating apparatus according to the present invention.

The apparatus 1 comprises a hollow casing 2 having a central axis A and it is configured to rotate about a central axis A.

The hollow casing 2 extends preferably along a central axis A between a first end 2a and a second end 2b, opposite to the first end 2a.

The hollow casing 2 comprises a wall 3. In particular, the wall 3 has a central region 3a at substantially the central axis A and a peripheral region 3b external to the central region 3a. In still greater detail, the wall 3 defines a cavity 4. The wall 3 has the function to separate the cavity 4 from an external environment.

The cavity 4 is configured to contain one first coolant fluid, preferably water.

The hollow casing 2 is in particular sealed from the external environment. Even more in particular, the hollow casing 2 is configured to retain the first coolant fluid within the cavity 4 such as to prevent leakages and intrusions of other fluids inside the cavity 4. In greater detail, the hollow casing 2 has a disc portion 11 preferably at the first end 2a. Such disc portion 11 has an upper surface 11a, a lower surface 11b and an edge 11c placed between the upper surface 11a and the lower surface 11b. In particular, the upper surface 11a and the lower surface 11b and the edge 11c define at least partially the wall 3. More in detail, the disc portion 11 has a diameter Dd.

The hollow casing 2 also has a truncated-cone portion 12 extended along the central axis A from the lower surface 11b to the second end 2b. Such truncated-cone portion 12 defines at least partially the cavity 4. In particular, the truncated-cone portion 12 has a base 13 at the second end 2b. In greater detail, the base 13 is preferably a substantially flat circular plate having a first diameter Di.

In still greater detail, the truncated-cone portion 12 has a side wall 14 connected to the base 13 and to the lower surface 11b of the disc portion 11.

Figure 4:
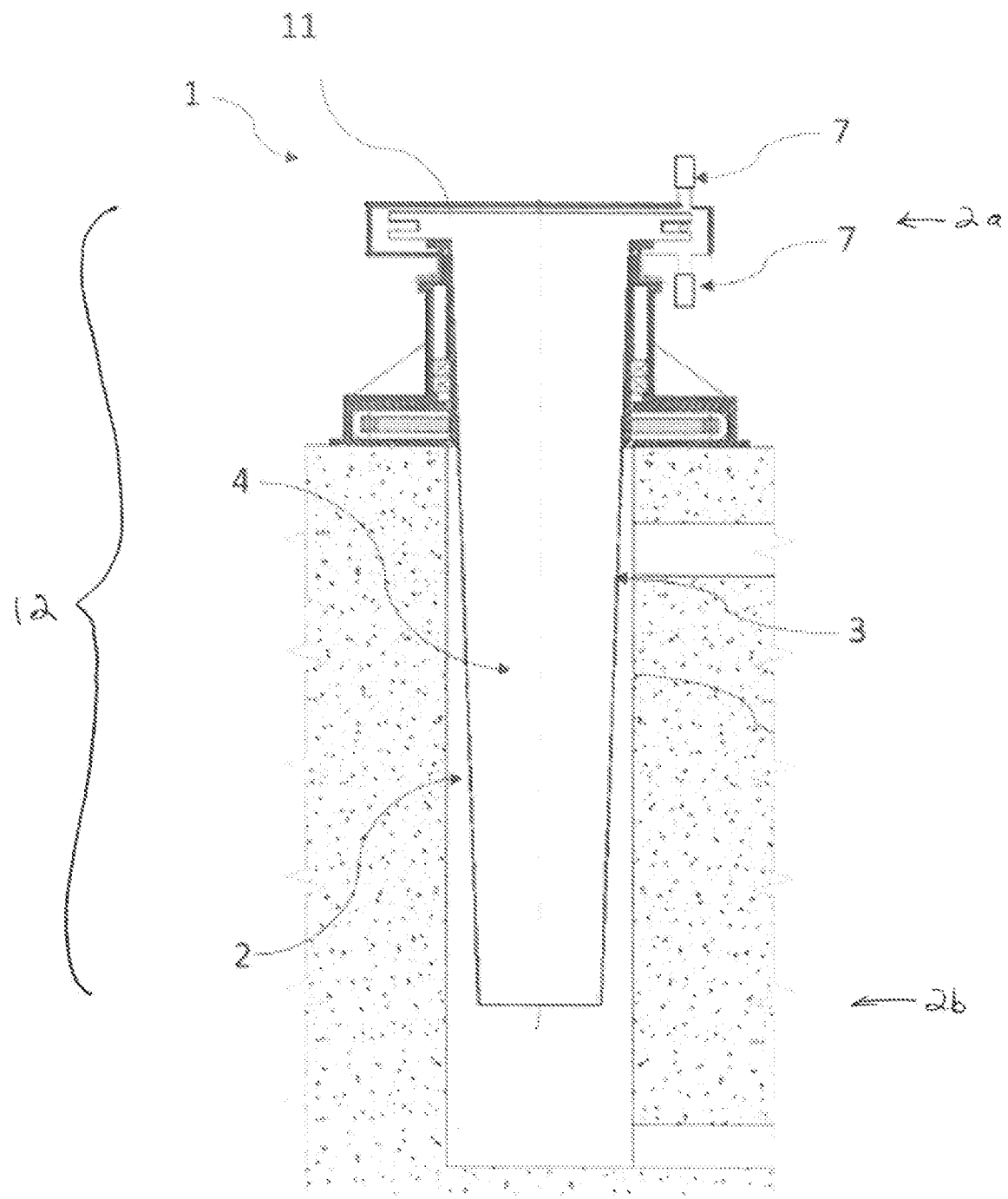
FIG. 4 is a section view of the apparatus for generating neutrons of FIG. 1, showing both sides of central axis A.

According to the embodiment of the present invention shown in FIGS. 1 and 4, the truncated-cone portion 12 is tapered to direct the first coolant fluid into the disc portion 11 preferably near the edge 11c. In greater detail, the side wall 14 defines a connecting edge 15 opposite to the base 13 along the central axis A. Preferably, the truncated-cone portion 12 is connected to the lower surface 11b of the disc portion 11 at the connecting edge 15.

In still greater detail, the connecting edge 15 has a second diameter Dm greater than the first diameter Di relative to the base 13 and preferably smaller than or equal to diameter Dd of the disc portion 11.

The cavity 4 is wholly defined by the disc portion 11 and by the truncated-cone portion 12, preferably aligned along the central axis A and centered with respect thereto.

According to the preferred embodiment of the present invention shown in the figures, the diameter Dd of the disc portion 11 is greater than the second diameter Dm. In particular, the disc portion 11 near the edge 11c protrudes externally from the side wall 14 of the truncated-cone portion 12. In greater detail, the lower surface 11b extends between the side wall 14, in particular at the connection between the two portions 11, 12, and the edge 11c. It must be noted that the lower surface 11b has a substantially circular ring shape.

Preferably, the hollow casing 2 is made of a metal material able to withstand mechanical and thermal stresses it is subjected to.

According to the preferred embodiment of the present invention shown in the figures, the hollow casing 2 is kept vertically along the central axis A such that the disc portion 11 is positioned over the truncated-cone portion 12. In particular, the central axis A of the hollow casing 2 is substantially perpendicular to a basement 22, parallel to the ground. In greater detail, the hollow casing 2 extends from the truncated-cone portion 12 near the basement 22 along the central axis A.

According to the preferred embodiment of the present invention, an active layer 6 is at least partially positioned on the peripheral region 3b externally to the cavity 4. In particular, the active layer 6 is configured to promote a neutron-generating reaction, preferably a nuclear fusion reaction. The active layer 6 is preferably composed of titanium previously or simultaneously enriched of tritium by implantation.

Advantageously, the active layer is configured to promote the nuclear fusion reaction to generate flows of 14 MeV fast neutrons.

In particular, the active layer 6 is located on the disc portion 11 preferably at the edge 11c. Preferably, the active layer 6 has circular ring shape near the edge 11c. Optionally, the apparatus 1 can comprise two active layers 6, respectively placed on the upper surface 11a and on the lower surface 11b of the disc portion 11.

Figure 5:
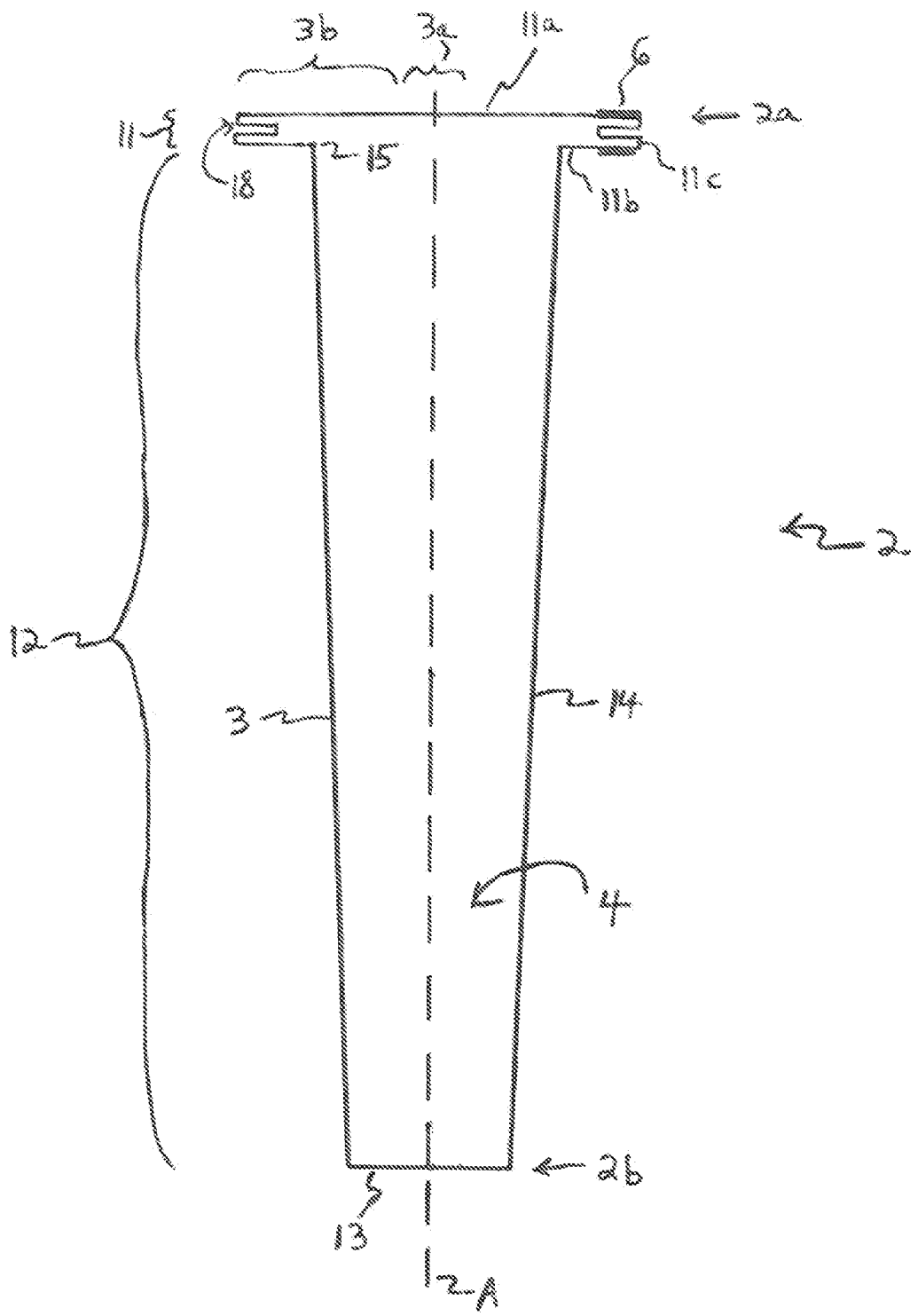
FIG. 5 is a section view of the hollow casing of the apparatus for generating neutrons of FIG. 1, showing both sides of central axis A.

FIG. 5 is a section view of the hollow casing 2 of the apparatus 1. FIG. 5 shows hollow casing 2 with central axis A, wall 3 with central region 3a and peripheral region 3b, and cavity 4 defined by wall 3. Hollow casing 2 extends between first end 2a and second end 2b. Hollow casing 2 has a disc portion 11, preferably at first end 2a, with upper surface 11a, lower surface 11b, edge 11c, and circumferential recess 18. Hollow casing 2 also has a truncated-cone portion 12 extending from connecting edge 15 at lower surface 11b to base 13 at second end 2b. Truncated-cone portion 12 includes side wall 14. Active layer 6 is located on disc portion 11 preferably at edge 11c.

At least one particle accelerator 7 is configured to direct a particle and/or ion beam, preferably deuterium ions, on the active layer 6 to activate the nuclear fusion reaction. In particular, the ion beam affects the peripheral region 3b at the active layer 6. In greater detail, the particle accelerator 7 is positioned such that the ion beam is substantially perpendicular to the upper surface 11a and the lower surface 11b of the disc portion 11 at the active layer 6. In still greater detail, the particle accelerator 7 is fixed with respect to the rotation of the hollow casing 2.

In other words, the particle accelerator 7 substantially faces the disc portion 11 at the edge 11*c*. In particular, the particle accelerator 7 is configured to realize the fusion reaction in a reaction region 21. The reaction region 21 is in particular the region where each ion beam affects the disc portion 11 and results substantially fixed during the rotation of the hollow casing 2 with respect to the particle accelerator 7.

The apparatus 1 comprises a seat 16 positioned near the active layer 6 to retain a sample to be irradiated 17. Preferably, the seat 16 is configured to retain the sample to be irradiated 17 downstream of the nuclear fusion reaction such as to receive the neutron flow generated by the reaction itself. In greater detail, the edge 11*c* has a circumferential recess 18. Such circumferential recess 18 defines the seat 16. Preferably, the sample to be irradiated 17 is held fixed with respect to the hollow casing 2 rotating in a way known to the skilled in the art and herein not further described in detail. In particular, the sample to be irradiated 17 is constantly held near the reaction region 21.

According to the embodiment shown in FIG. 1, the system comprises two particle accelerators 7 on opposite sides with respect to the disc portion 11. Each particle accelerator 7 is associated to a respective active layer 6, such that a first ion beam affects the upper surface 11*a* and a second ion beam affects the lower surface 11*b* in the respective reaction regions 21. In this case, the seat 16 and the sample to be irradiated 17 are arranged between the two active layers 6 and are in particular equidistant between them.

Advantageously, in this way the sample to be irradiated 17 receives two neutron flows simultaneously. Preferably, particle accelerators 7 are configured to realize the nuclear fusion reactions simultaneously on the upper surface 11*a* and on the lower surface 11*b*. In greater detail, the fusion reaction realized on the upper surface 11*a* generates a neutron flow substantially towards the lower surface 11*b* and vice versa.

It must be noted that each ion beam affecting the disc portion 11 and each fusion reaction release thermal power on the disc portion 11 itself. To dispose of such thermal power, the apparatus 1 comprises movement means 8, in particular coupled to the side wall 14. Such movement means 8 force, by rotating the hollow casing 2 about the central axis A, the first coolant liquid to lightly touch internally the wall 3 at the active layer 6 to internally cool the hollow casing 2.

In particular, movement means 8 allows to remove the thermal power released on the wall 3 at the active layer 6, directing the first coolant fluid from the truncated-cone portion 12 to the disc portion 11. In other words, movement means 8 forces the first coolant fluid into the disc portion 11 by means of centrifugal force.

In greater detail, movement means 8 is configured to push the first coolant fluid at the edge 11*c* of the disc portion 11, promoting the removal of the thermal power released during the neutron beam generation.

Preferably, the hollow casing 2 is configured to remove the thermal power released at the reaction regions 21 by means of a first phase change of the first coolant fluid.

Movement means 8 rotating the hollow casing 2 moves the first coolant fluid, contained in the cavity 4 at the circumferential recess 18, ensuring the removal of thermal power from the disc portion 11 by means of the first phase change of the first coolant fluid. In particular, the first coolant fluid spreads internally between the circumferential recess 18 and the upper and lower surfaces 11*a*, 11*b* near the edge 11*c*. In greater detail, according to the embodiment comprising a single particle accelerator 7, the first phase change occurs at the upper surface 11*a* where externally the nuclear fusion reaction occurs. In case two particle accelerators 7 are present, the first phase change occurs at the upper surface 11*a* and the lower surface 11*b*.

According to the preferred embodiment of the present invention the first coolant fluid is a liquid, in particular, water and the first phase change is evaporation.

Advantageously, the first coolant fluid introduced into the cavity 4 allows to reach the saturated vapor pressure at a pre-established working temperature TL, preferably 60° C., having a liquid phase and a gas phase coexisting.

In other words, the disc portion 11 internally at the edge 11*c* acts as evaporator, ensuring that the thermal power produced by the nuclear fusion is transmitted to the first coolant fluid accumulated in the liquid phase in the evaporator. Thereby, transforming the thermal power in evaporation latent heat, the first coolant fluid is transformed into gas phase without undergoing thermal rise and the thermal power is removed from the disc portion 11.

Preferably, movement means 8 comprises supporting elements 23 configured to maintain the hollow casing 2 vertical and configured to bear the weight thereof.

Figure 2:
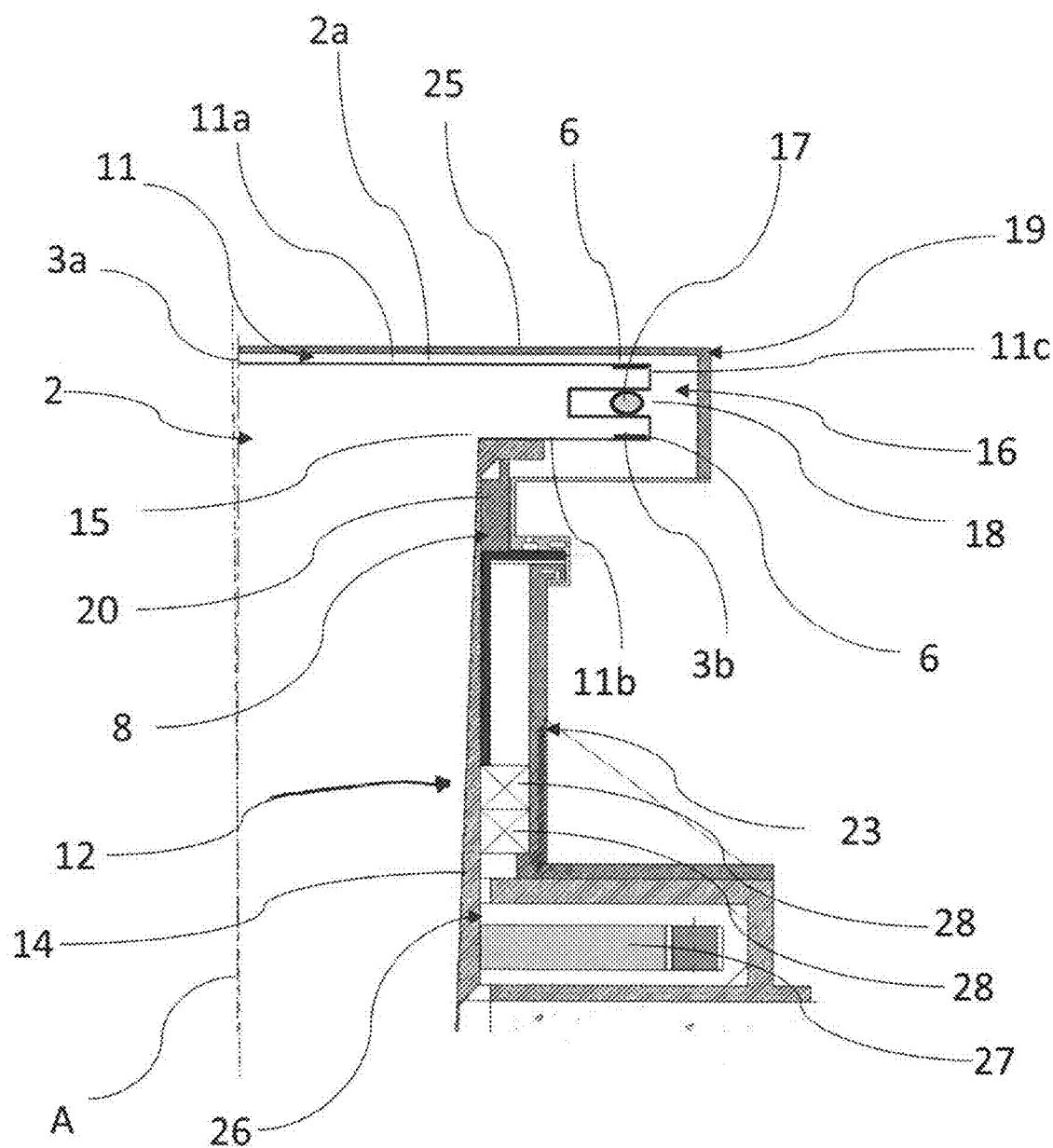
FIG. 2 is a section view of a detail of the apparatus for generating neutrons of FIG. 1.
Figure 3:
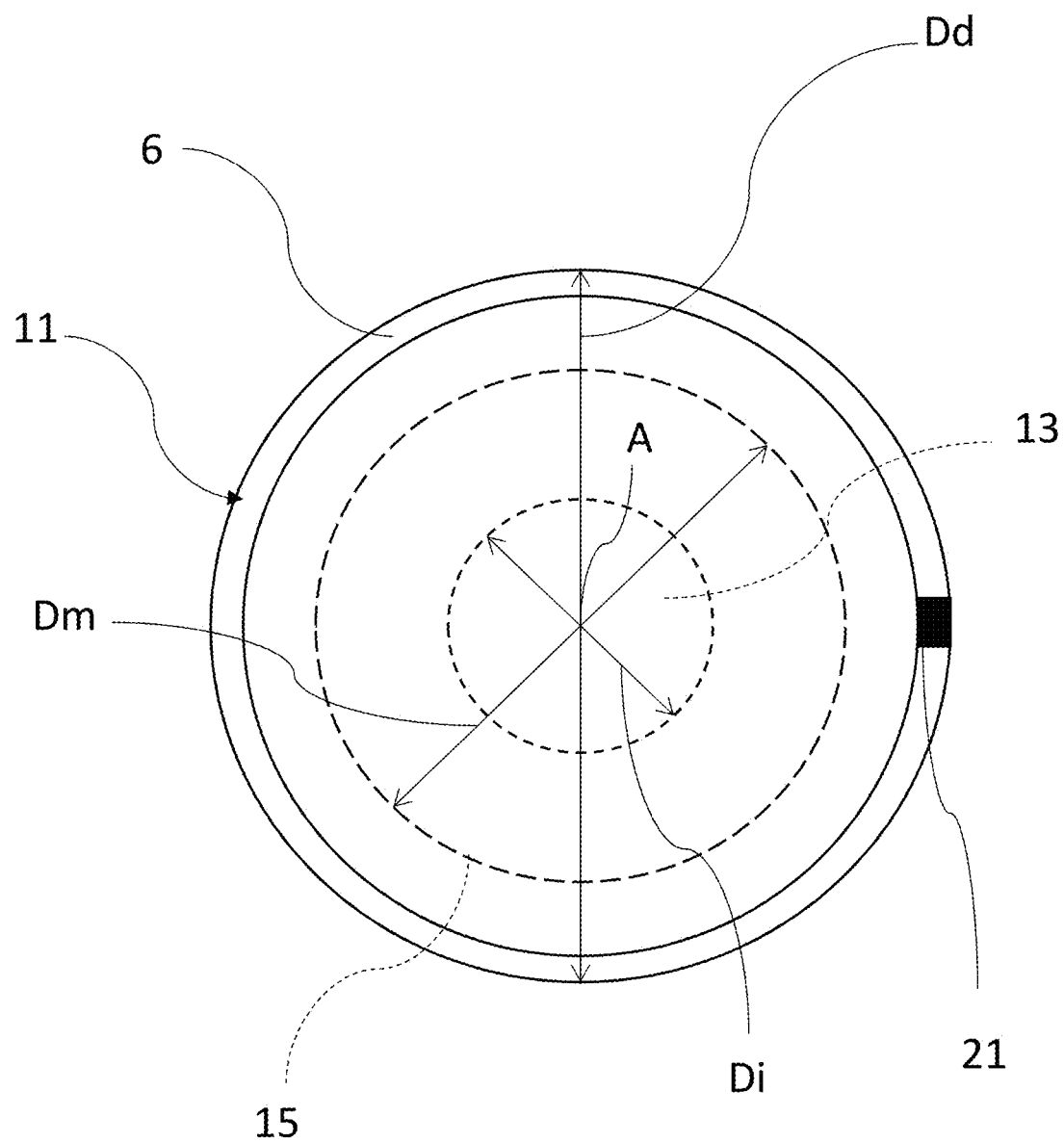
FIG. 3 is a view from above of the apparatus for generating neutrons of FIG. 1 with some parts being removed to better show others.

According to the embodiment shown in the FIGS. 1 and 2, the movement means 8 further comprises a compartment 26 configured to house a rotation mechanism 27. In particular, such rotation mechanism 27 can comprise a toothed wheel coupled to a pinion driven by an external electrical engine or a turbine driven by compressed air from an external compressor. The toothed wheel or turbine, whose choice depends on the requested speed, is fitted on the external surface of the hollow casing 2. According to such embodiment, the side wall 14 of the hollow casing 2 at the compartment 26 has externally a cylindrical profile configured for mechanical dragging. In still greater detail, movement means 8 comprises one or more bearings 28 coupled to the side wall 14 such as to ease the hollow casing 2 rotation. Preferably, such bearings are positioned between the disc portion 11 and the compartment 26.

External cooling means 9 is configured to externally cool the hollow casing 2. In particular, external cooling means 9 comprises a second coolant fluid lightly touching externally at least partially the wall 3. The hollow casing 2, being sealed, prevents the second coolant fluid from entering inside the cavity 4 or from mixing with the first coolant fluid.

In particular, external cooling means 9 is configured to remove from the hollow casing 2 the thermal power transmitted at the active layer 6. In greater detail, external cooling means 9 is configured to cool the first coolant fluid lightly touching with the second coolant fluid at the base 13 (as discussed above, there is no direct contact between the first coolant fluid and the second coolant fluid) and at least partially at the side wall 14 near the base 13. In still greater detail, external cooling means 9 is configured to make a second phase change of the first coolant fluid at least at the side wall 14 lightly touched externally by the second coolant liquid.

According to the preferred embodiment of the present invention, the second phase change consists in condensing at least partially the vapor produced by the first phase change at least partially along the side wall 14. In particular, the specific volume increasing due to the vapor produced near the disc portion 11 and the specific volume decreasing due to vapor condensation generate a pressure difference between the first end 2*a* and the second end 2*b* of the hollow casing 2. The pressure difference attracts towards the second end 2b the vapor produced, allowing the second phase change on the side wall 14. In this way, the hollow casing 2 is configured to transfer thermal power to the second coolant fluid by means of the second phase change. In still greater detail, the second phase change transfers the thermal power to the second coolant fluid by conduction through the side wall 14 and preferably the base 13.

In other words, at least a part of the truncated-cone portion 12 acts as a condenser. In particular, external cooling means 9 keep the second coolant fluid at a temperature lower than the pre-established working temperature TL of the first coolant fluid. Thus, the contact between the vapor generated inside the hollow casing 2 and the side wall 14 causes the second phase change by condensing vapor and removing thereby heat from the hollow casing 2.

Advantageously, the sealed hollow casing 2 allows the thermal power transfer from the active layer 6 towards the second coolant fluid to occur as a result of the first and second phase changes.

External cooling means 9 comprise a basin 24 and an external heat exchanger, not shown, configured to maintain the second coolant fluid at an external threshold temperature TC heated by the hollow casing 2. In particular, the external threshold temperature TC is lower than the pre-established working temperature TL of the first coolant fluid.

In detail, the basin 24 is in fluid communication with the external heat exchanger to ensure cooling of the second coolant fluid.

In greater detail, the basin 24 contains the second coolant fluid and is configured to contain the base 13 and at least partially the side wall 14 of the truncated-cone portion 12. In other words, the hollow casing 2 is partially immersed into the basin 24 at the truncated-cone portion 12.

In still greater detail, the basement 22 is preferably the bottom of the basin 24.

According to the preferred embodiment of the present invention, the condensation of the first coolant fluid in the form of vapor allows to transfer latent condensation heat to the side wall 14, which transfers latent condensation heat by conduction to the second coolant fluid, which heats up.

Advantageously, the apparatus 1 is configured to transfer the nuclear fusion thermal power to the second coolant fluid by means of a forced convection of the first coolant fluid due to the evaporation process and condensation kept by movement means 8 and by external cooling means 9.

Advantageously, the partial immersion of the hollow casing 2 inside the basin 24 ensures a uniform cooling of the hollow casing 2.

According to the preferred embodiment, movement means 8 are coupled to the side wall 14 such as to immerse the base 13 and at least partially the side wall 14 in the basin 24.

The apparatus 1 further comprises vacuum sealing means 19 configured to keep the vacuum between the particle accelerator 7 and at least the disc portion 11 to realize the neutron-generating reaction. In particular, vacuum sealing means 19 is fixed and insulates the disc portion 11 from the external environment and at least partially the side wall 14 at the connection with the disc portion 11.

Advantageously, vacuum sealing means 19 limit the dispersion of ions accelerated by the particle accelerator, in particular tritium ions.

Advantageously, vacuum sealing means 19 allow the operation of particle accelerators.

In greater detail, vacuum sealing means 19 comprises at least a rotating seal 20 configured to maintain the vacuum externally to the disc portion 11 of the hollow casing 2. In particular, the rotating seal 20 is positioned at the connection between the disc portion 11 and the side wall 14.

According to the preferred embodiment of the present invention shown in the figures, the rotating seal 20 is placed at movement means 8 such as to avoid vacuum loss during rotation.

In greater detail, vacuum sealing means 19 comprise an external cover 25 to which one or more of the above-described particle accelerators 7 are connected, such as to maintain the vacuum from the external environment.

Furthermore, vacuum sealing means 19 comprises a vacuum pump, not shown, configured to maintain the vacuum within the external cover 25, in particular between the external cover 25 and the disc portion 11.

Neutron generation and the cooling of the neutron-generating apparatus 1 occur as follows.

First of all, the hollow casing 2 is filled with the first coolant fluid and sealed from the external environment preventing the hollow casing 2 to be in fluid communication with the external environment.

In a subsequent step, the hollow casing 2 is partially immersed inside the basin 24 in contact with the second coolant fluid and connected to movement means 8 at the connection between the disc portion 11 and the truncated-cone portion 12. In particular, the hollow casing 2 is kept at a pre-established height from the basement 22. Furthermore, the hollow casing 2 is maintained in a preestablished position such to expose the active layer 6 to the ion flow generated by particle accelerators 7.

Then, the sample to be irradiated 17 is positioned within the circumferential recess 18 and kept fixed with respect to the hollow casing.

After that, the hollow casing 2 and particle accelerators 7 are insulated from the external environment by means of vacuum sealing means 19.

In a later step, the hollow casing 2 is rotated with respect to the central axis A by movement means 8 which take the first coolant fluid, preferably water, to the edge 11c by means of the centrifugal force generated by the rotation.

Then, particle accelerators 7 direct the ion flow on the active layer 6 at the reaction region 21 initiating the nuclear fusion reaction. In particular, the neutron flow generated by each reaction irradiates the sample positioned in the circumferential recess 18.

Once the fusion reaction has started, the thermal power released at the active layer 6 causes the first phase change of the first coolant fluid forced at the edge 11c, the first fluid, preferably water, evaporates. In particular, the first and second phase change generate a pressure difference between the first end 2a and the second end 2b.

Then, the pressure difference moves the generated vapor towards the second end 2b of the hollow casing 2 along the central axis A, causing the second phase change, that is to say vapor condensation. In particular, vapor, impacting on the side wall 14 and preferably on the base 13 realizes the second phase change. In greater detail, vapor, by condensing, exchanges heat with the second coolant liquid maintained at a lower temperature.

After the second phase change, the first coolant fluid migrates again towards the disc portion 11 near the edge 11c by centrifugal force due to the rotation of the hollow casing 2.

Advantageously, the perfectly sealed hollow casing 2 allows to replace the casing itself if necessary to prevent leakage into the external environment of radioactive products possibly contained in the first coolant fluid. In particular, in case the first coolant fluid is water, the sealed hollow casing 2 avoids leakage of tritium water produced during the functioning of the apparatus 1.

Advantageously, the sealed hollow casing 2 can be easily transported in reconditioning basins.

Advantageously, the absence of mechanical members, such as pumps and tubes, inside the hollow casing 2 allows to simplify the neutron-generating system.

The invention claimed is:

1. An apparatus for generating neutrons, the apparatus comprising:
a hollow casing having a central axis and configured to rotate about the central axis, the hollow casing comprising a wall having a central region substantially at the central axis and a peripheral region external to the central region, wherein the wall defines a cavity, and wherein the cavity is configured to contain a first coolant fluid;
an active layer at least partially on the peripheral region external to the cavity, wherein the active layer is configured to realize a neutron-generating reaction;
at least one particle accelerator configured to direct an ion beam on the active layer to activate the neutron-generating reaction;
movement means configured to rotate the hollow casing about the central axis and to force the first coolant fluid to contact an internal surface of the wall at the active layer for cooling the hollow casing; and
external cooling means configured to externally cool the hollow casing, wherein the external cooling means comprises a second coolant fluid contacting at least an external portion of the wall;
wherein the hollow casing is sealed with respect to an external environment to retain the first coolant fluid within the cavity and to prevent the second coolant fluid from mixing with the first coolant fluid, and
wherein the first coolant fluid transfers heat through the wall of the hollow casing directly to the second coolant fluid.

2. The apparatus of claim 1, wherein the hollow casing extends longitudinally along the central axis between a first end and a second end, the hollow casing further comprising:
a disc portion at the first end, the disc portion having an upper surface, a lower surface, and an edge between the upper surface and the lower surface, wherein the upper surface, the lower surface, and the edge define at least in part the wall; and
a truncated-cone portion extended along the central axis from the lower surface to the second end, the truncated-cone portion having a base at the second end and a side wall connected to the base and to the lower surface of the disc portion, wherein the base and the side wall define at least in part the wall.

3. The apparatus of claim 2, wherein the truncated-cone portion is tapered to direct the first coolant fluid into the disc portion at the edge.

4. The apparatus of claim 2, wherein the active layer is on the disc portion near the edge.

5. The apparatus of claim 2, further comprising:
a seat near the active layer;
wherein the seat is configured to retain a sample to be irradiated.

6. The apparatus of claim 5, wherein the edge of the disc portion has a circumferential recess defining the seat.

7. The apparatus of claim 2, further comprising:
vacuum-sealing means fixed with respect to the hollow casing and configured to maintain vacuum between the at least one particle accelerator and at least the disc portion to realize the neutron-generating reaction.

8. The apparatus of claim 7, wherein the vacuum-sealing means comprises:
at least one rotating seal configured to maintain the vacuum externally with respect to the disc portion of the hollow casing.

9. The apparatus of claim 2, wherein the central axis of the hollow casing is substantially vertical, and
wherein the disc portion is above the truncated-cone portion.

10. The apparatus of claim 1, wherein the apparatus is configured to maintain the second coolant fluid at lower temperature than the first coolant fluid.

11. The apparatus of claim 1, wherein the first coolant fluid comprises water.

12. The apparatus of claim 2, wherein when the movement means rotates the hollow casing, centrifugal force causes a liquid phase of the first coolant fluid to move from the truncated-cone portion toward the disc portion.

13. The apparatus of claim 1, wherein the hollow casing extends longitudinally along the central axis between a first end and a second end,
wherein rotation of the hollow casing causes a liquid phase of the first coolant fluid to move from the second end toward the first end, and
wherein a pressure difference between the first end and the second end causes a vapor phase of the first coolant fluid to move from the first end toward the second end.

14. The apparatus of claim 1,
wherein the hollow casing extends longitudinally along the central axis between a first end and a second end,
wherein at the first end, the first coolant fluid undergoes a first phase change from a liquid phase to a vapor phase,
wherein at the second end, the first coolant fluid undergoes a second phase change from the vapor phase to the liquid phase, and
wherein a pressure difference caused by the first and second phase changes causes the vapor phase of the first coolant fluid to move from the first end toward the second end.

15. An apparatus for generating neutrons, the apparatus comprising:
a hollow casing having a central axis and configured to rotate about the central axis, the hollow casing comprising a wall having a central region substantially at the central axis and a peripheral region external to the central region, wherein the wall defines a cavity, and wherein the cavity is configured to contain a first coolant fluid;
an active layer at least partially on the peripheral region external to the cavity, wherein the active layer is configured to realize a neutron-generating reaction;
at least one particle accelerator configured to direct an ion beam on the active layer to activate the neutron-generating reaction;
movement means configured to rotate the hollow casing about the central axis and to force the first coolant fluid to contact an internal surface of the wall at the active layer for cooling the hollow casing; and
external cooling means configured to externally cool the hollow casing, wherein the external cooling means comprises a second coolant fluid contacting at least an external portion of the wall;

wherein the hollow casing is sealed with respect to an external environment to retain the first coolant fluid within the cavity, wherein the hollow casing extends longitudinally along the central axis between a first end and a second end, the hollow casing further comprising:
  a disc portion at the first end, the disc portion having an upper surface, a lower surface, and an edge between the upper surface and the lower surface, wherein the upper surface, the lower surface, and the edge define at least in part the wall; and
  a truncated-cone portion extended along the central axis from the lower surface to the second end, the truncated-cone portion having a base at the second end and a side wall connected to the base and to the lower surface of the disc portion, wherein the base and the side wall define at least in part the wall;

wherein the cavity is defined by the disc portion and by the truncated-cone portion, and wherein the movement means is configured to push the first coolant fluid from the truncated-cone portion to the disc portion.

16. The apparatus of claim 15, wherein the apparatus is configured to maintain the second coolant fluid at lower temperature than the first coolant fluid.

17. The apparatus of claim 15, wherein the first coolant fluid comprises water.

18. An apparatus for generating neutrons, the apparatus comprising:
  a hollow casing having a central axis and configured to rotate about the central axis, the hollow casing comprising a wall having a central region substantially at the central axis and a peripheral region external to the central region, wherein the wall defines a cavity, and wherein the cavity is configured to contain a first coolant fluid;
  an active layer at least partially on the peripheral region external to the cavity, wherein the active layer is configured to realize a neutron-generating reaction;
  at least one particle accelerator configured to direct an ion beam on the active layer to activate the neutron-generating reaction;
  movement means configured to rotate the hollow casing about the central axis and to force the first coolant fluid to contact an internal surface of the wall at the active layer for cooling the hollow casing; and
  external cooling means configured to externally cool the hollow casing, wherein the external cooling means comprises a second coolant fluid contacting at least an external portion of the wall;

wherein the hollow casing is sealed with respect to an external environment to retain the first coolant fluid within the cavity, wherein the hollow casing extends longitudinally along the central axis between a first end and a second end, the hollow casing further comprising:
  a disc portion at the first end, the disc portion having an upper surface, a lower surface, and an edge between the upper surface and the lower surface, wherein the upper surface, the lower surface, and the edge define at least in part the wall; and
  a truncated-cone portion extended along the central axis from the lower surface to the second end, the truncated-cone portion having a base at the second end and a side wall connected to the base and to the lower surface of the disc portion, wherein the base and the side wall define at least in part the wall;

wherein the base of the truncated-cone portion has a first diameter, wherein the side wall of the truncated-cone portion defines a connecting edge opposite to the base, wherein the truncated-cone portion is connected to the lower surface of the disc portion at the connecting edge, and wherein the connecting edge has a second diameter greater than the first diameter of the base, and wherein the disc portion has a third diameter greater than or equal to the second diameter of the connecting edge of the truncated-cone portion.

19. The apparatus of claim 18, wherein the apparatus is configured to maintain the second coolant fluid at lower temperature than the first coolant fluid.

20. The apparatus of claim 18, wherein the first coolant fluid comprises water.

* * * * *